(12) United States Patent  
Lau et al.

(10) Patent No.: US 11,990,014 B2
(45) Date of Patent: May 21, 2024

(54) SMART ALARM MANAGEMENT

(71) Applicant: CHECKPOINT SYSTEMS, INC., Thorofare, NJ (US)

(72) Inventors: Paul Lau, Thorofare, NJ (US); Christophe Castagne, Thorofare, NJ (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 313 days.

(21) Appl. No.: 17/427,696

(22) PCT Filed: Jan. 30, 2020

(86) PCT No.: PCT/US2020/015829
§ 371 (c)(1),
(2) Date: Aug. 2, 2021

(87) PCT Pub. No.: WO2020/160233
PCT Pub. Date: Aug. 6, 2020

(65) Prior Publication Data
US 2022/0114871 A1    Apr. 14, 2022

(51) Int. Cl.
*G06T 7/70*       (2017.01)
*G06N 20/00*      (2019.01)
(Continued)

(52) U.S. Cl.
CPC .......... *G08B 13/248* (2013.01); *G06N 20/00* (2019.01); *G06T 7/70* (2017.01); *G06V 10/70* (2022.01); *G06V 20/52* (2022.01); *G06V 40/10* (2022.01); *G08B 13/2417* (2013.01); *G08B 25/008* (2013.01); *G08B 29/186* (2013.01);
(Continued)

(58) Field of Classification Search
None
See application file for complete search history.

(56) References Cited

U.S. PATENT DOCUMENTS 7,844,505 B1 * 11/2010 Arneson .............. G06Q 10/087
705/28
2008/0278320 A1   11/2008 Soto et al.
(Continued)

FOREIGN PATENT DOCUMENTS

| CN | 101681542 | 3/2010 |
|---|---|---|
| CN | 107103718 | 8/2017 |
| WO | WO9905659 | 2/1999 |

OTHER PUBLICATIONS

Patent Cooperation Treaty (PCT), International Search Report and Written Opinion for Application PCT/US2020/015829 filed Jan. 30, 2020, dated Jun. 12, 2020, International Searching Authority, US.

*Primary Examiner* — John F Mortell
(74) *Attorney, Agent, or Firm* — McDonald Hopkins LLC

(57) ABSTRACT

A security alarm management system and method includes a reader device, a person counter, and an alarm. The reader device reads security tags within a range of the reader. The person counter detects people passing through a point of entry. The person counter can determine a direction of travel of people passing through the point of entry. A white-list includes entries or product identifiers that will not trigger an alarm. The alarm is triggered if conditions associated with the reader device, person counter, and white-list are met.

18 Claims, 5 Drawing Sheets

Intelligent Alarm Management (I.A.M)
the Intelligent Alarm Management technology allows within the defined alarm zone to configure partern for which the alarm can be inibited or rendered silent (only notification to pagers or smart phone App) whenever the person triggering the alarm with unpaid tag can't be clearly identified, for instance: When there are more than 1 person inside the alarm one when the EAS device detects an upaid tags.

Exception:
the overehad counting device can detect if:
a group of persons are leaving the store at the sam path, same speed and close to each other this group is identified a single shopping unit and alarm can be trigger if unpaid item is detected.

(51) Int. Cl.
  *G06V 10/70* (2022.01)
  *G06V 20/52* (2022.01)
  *G06V 40/10* (2022.01)
  *G08B 13/24* (2006.01)
  *G08B 25/00* (2006.01)
  *G08B 29/18* (2006.01)

(52) U.S. Cl.
  CPC ............ *G06T 2207/20081* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 2008/0309491 | A1 | 12/2008 | Gillard et al. |
| 2010/0039264 | A1 | 2/2010 | Bergman |
| 2010/0176947 | A1* | 7/2010 | Hall ................ G08B 13/248 340/572.1 |
| 2012/0307051 | A1* | 12/2012 | Welter ............ G08B 13/2482 340/572.1 |
| 2013/0015355 | A1* | 1/2013 | Noone .............. G08B 13/248 250/340 |
| 2014/0062728 | A1* | 3/2014 | Soto .................... G01S 7/415 340/933 |
| 2014/0197237 | A1* | 7/2014 | Davis ............... G08B 13/246 235/385 |
| 2016/0098907 | A1* | 4/2016 | Noone ................... G01V 8/10 340/551 |
| 2019/0027010 | A1 | 1/2019 | Doyle |
| 2019/0088096 | A1* | 3/2019 | King ............ G08B 13/19665 |
| 2022/0114871 | A1 | 4/2022 | Lau |

\* cited by examiner

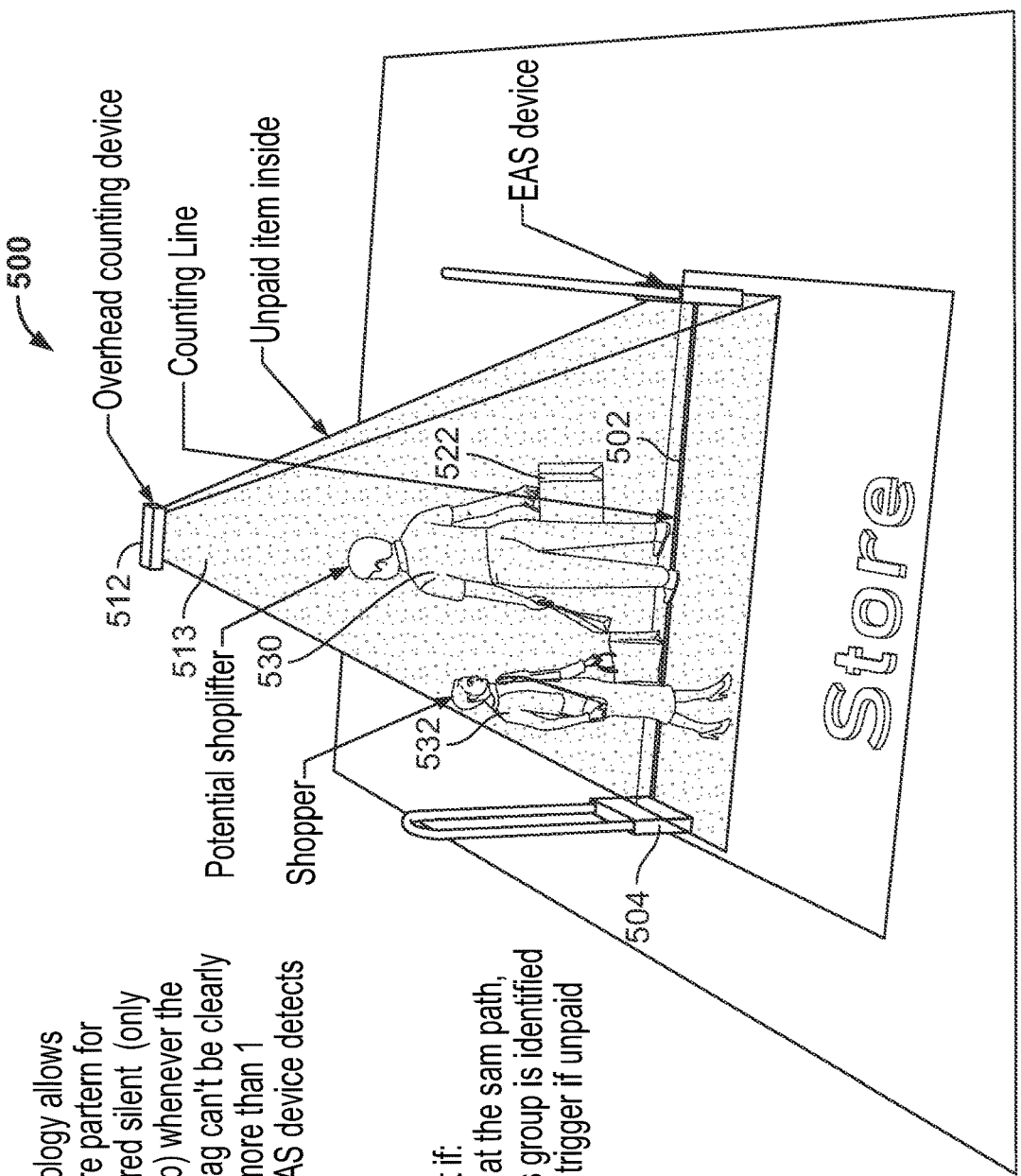

FIG. 5

Intelligent Alarm Management (I.A.M)
the Intelligent Alarm Management technology allows within the defined alarm zone to configure partern for which the alarm can be inibited or rendered silent (only notification to pagers or smart phone App) whenever the person triggering the alarm with unpaid tag can't be clearly identified, for instance. When there are more than 1 person inside the alarm one when the EAS device detects an upaid tags.

Exception:
the overehad counting device can detect if:
a group of persons are leaving the store at the sam path, same speed and close to each other this group is identified a single shopping unit and alarm can be trigger if unpaid item is detected.

SMART ALARM MANAGEMENT

CROSS-REFERENCE TO RELATED APPLICATION

This application is a 35 U.S.C. § 371 national stage application of PCT Application No. PCT/US2020/015829 filed on Jan. 30, 2020, entitled "SMART ALARM MANAGEMENT," which claims priority to Chinese Application No. 201910103384.2 filed on Feb. 1, 2019, each of which are incorporated herein by reference in their entireties.

TECHNICAL FIELD

The present disclosure relates to electronic article surveillance (EAS) systems, and, also, to smart alarm management for retail stores for use in inventory tracking and anti-theft applications.

BACKGROUND

Some traditional electronic article surveillance (EAS) systems include security tags or labels that can use radio frequency identification (RFID) tags or a resonant circuit with a coil and a capacitor that operate to resonate when exposed to a predetermined electromagnetic field (e.g., 8.2 MHz). RFID tags use an integrated circuit coupled to an antenna (e.g., dipole antenna) or a resonant circuit and operate to emit information when exposed to a predetermined electromagnetic field (e.g., 13.56 MHz). A reader device is typically provided at the point of exit/entry (POE) of a business or any location where it is desired to detect the unauthorized removal of tag bearing articles. These reader devices can sound or trigger an alarm to detect and warn of the theft of store merchandise.

False alarms can occur when tag bearing articles are close to the reader device or when a user enters a store. This could cause embarrassment to customers of the retail store and produce annoying alarm signals when no one is passing through the store's EAS system. Such false alarms can occur when a shopper passes through the EAS system, without possessing any tag-bearing (i.e., protected) merchandise, but an alarm is nevertheless sounded. Another type of a false alarm signal is a "merchandise" alarm, which occurs when a shopper carries non-protected merchandise through the EAS system which nevertheless exhibits the characteristics of an active tag or label. Examples of this are items such as extension cords and cables, foldable chairs, and other coiled metal objects which are capable of resonance in the presence of the electromagnetic field of an EAS system. A "phantom" false alarm occurs when an EAS system sounds an alarm responsive to the detection of an ambient signal, generally when there is no one passing through the EAS system. Examples of this are false alarm signals produced by tag bearing merchandise placed on display near enough to the EAS system to accidently cause its activation.

U.S. Pat. No. 5,030,941 to Lizzi, et al., the entirety of which is incorporated by reference herein, introduced an EAS system that uses directional detectors to detect in which direction people are passing through the pedestals.

Other attempts have been made to reduce false alarms. Some of these attempts may eliminate a single type of false alarm, such as a phantom alarm, but do not reduce a merchandise-activated alarm. Moreover, traditional systems typically require tag bearing articles to be placed a predetermined distance (e.g., 5 feet, 10 feet, etc.) away from reader devices so that the merchandise does not trigger a false alarm. This may limit the available space in retail stores at which merchandise can be displayed.

Moreover, existing antitheft security systems are susceptible to problems regarding false alarms, which tend to arise from environmental noise, resonance from the tagged items and undeactivated tags. In addition, many of the existing security tag systems are prone to false alarms, are not easily upgradable and require expensive retrofits, have a limited security tag read distance, and are degraded by environmental interference.

Thus, there remains a need for a security tag system that reduces false alarms, increases the usable space for displaying tagged information in a retail store, and improves efficiency of EAS systems.

DESCRIPTION OF THE DRAWINGS

The present teachings may be better understood by reference to the following detailed description taken in connection with the following illustrations, wherein:

FIG. 5 is a functional diagram of a smart alarm management system illustrating detection of multiple customers in accordance with various disclosed aspects.

DETAILED DESCRIPTION

Figure 1:
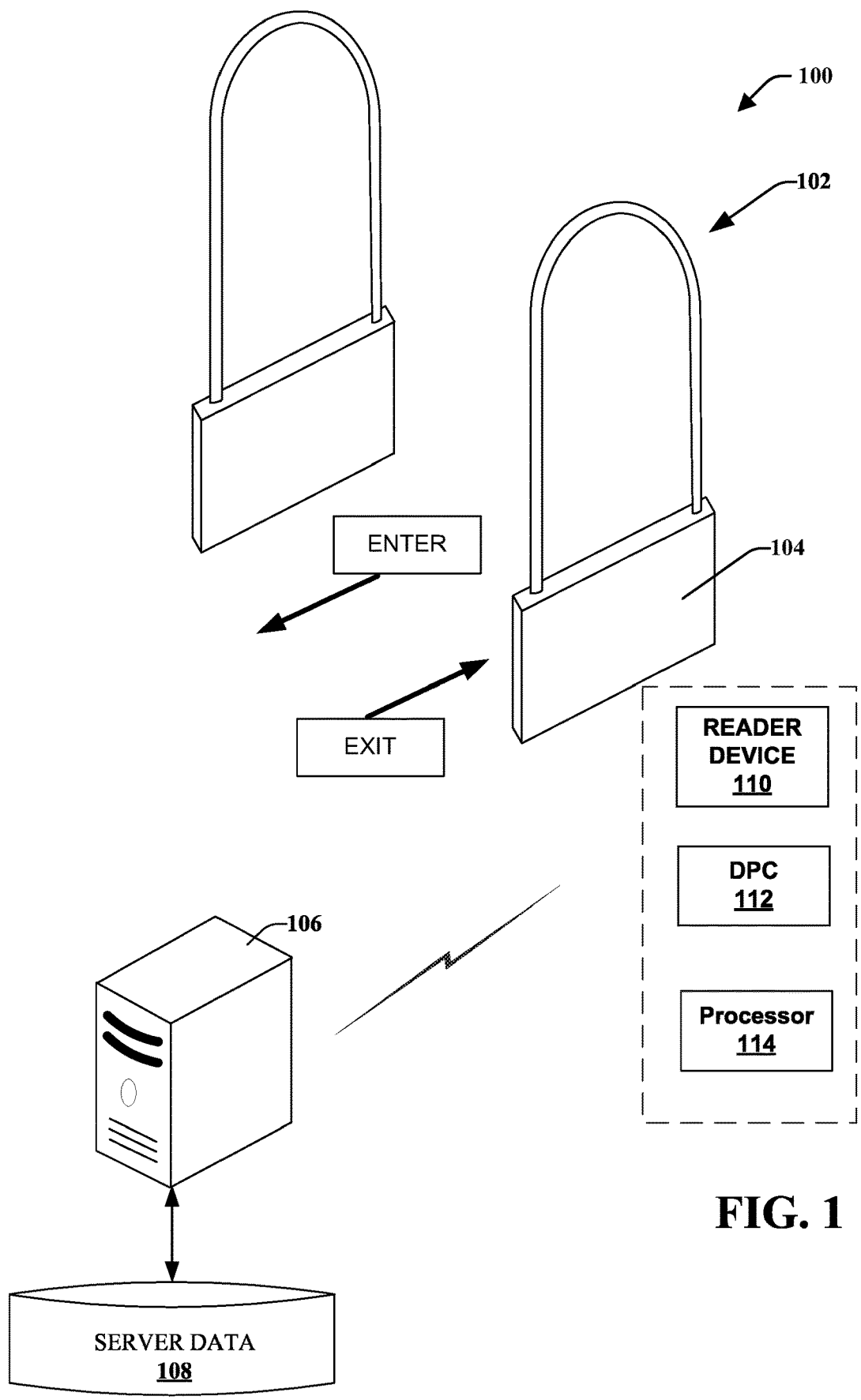
FIG. 1 is a functional diagram of a smart alarm management system in accordance with various disclosed aspects.

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "identification tag," "chip," "RFID device," and the like may be used interchangeably, unless context suggests otherwise or warrants a particular distinction among such terms. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennae located within the tag's near field, effectively forming an air-core transformer. The antennae may comprise various materials, such as copper. While an air-core transformer is described, various other antennae formations may be utilized.

In an example, an RFID component may include a tag and an emitter. The tag and emitter may each include one or more antennae. For instance, the tag may include a loop antenna and the emitter may include another loop antenna. It is noted that the loop antennae may or may not be substantially similar to each other. The tag antenna and emitter antenna may be operatively coupled via an electromagnetic field. The coupling may form or represent an air-core coil or transformer. The emitter may generate an alternating current that may be received by the emitter antenna. The current may induce an electromagnetic field through the air or another carrier medium. The electromagnetic field may induce a current in the tag antenna. The received current may provide power to various components of the tag.

In various embodiments, a tag may include the antenna (e.g., inlay), a processor, and a memory device. The memory device may include various types of memory, such as electrically erasable programmable read-only memory (EEPROM) and the like. When the tag is powered (e.g., current induced by the electromagnetic field), the tag may generate a response that may be received by the emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an RFID component may power a digital display and/or interface of a tag. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance Embodiments described herein may comprise a smart alarm management system that may utilize direction people counter devices and security tags to provide alarm-line accuracy at a POE of a retail store or other location utilizing an EAS system. Moreover, described embodiments may reduce false alarms, provide increased available floor space for display of tag bearing merchandise, or the like. At least some embodiments may utilize a white-list to monitor Electronic Product Code (EPC) or other product identifiers. The white-list may be used in combination with direction people counter devices and security tags to reduce false alarms.

In an example, a smart alarm management system may include a directional people counter with an exit GPO wired to a RFID reader device. The reader device may sense an assertive edge of a signal from a security tag and may measure or start a timer. Described systems may generate an alarm in response to the directional people counter identifying a triggering event (e.g., customer walking out) and a time condition being satisfied. In at least one embodiment, the system may prevent or otherwise not trigger an alarm if an EPC of the security tag is white-listed.

Turning to FIG. 1, shown is a functional diagram of a smart alarm management system 100 that may primarily include a reader device 110 and a directional people counter 112. In examples, the reader device 110 may comprise an entry gate 104 appropriately positioned at a point of entry 102 so as to allow customers to enter or exit a retail establishment through the entry gate 104, which may be comprised of a pair of screens spaced apart from each other. While described as screens or pedestals, it is noted that overhead systems may be utilized. For instance, entry gate 104 may comprise one or more overhead EAS device The reader device 110 may comprise an EAS transmitter/receiver and/or an RFID reader. For instance, the reader device 110 may comprise an RF transmitter and an antenna for producing swept radio frequency fields to detect the presence of a tag or label affixed to merchandise to be protected. In some embodiments, the antenna may comprise an overhead antenna. However, an overhead antenna is not required. Other configurations of antenna may also be utilized without departing from the present teachings. In another aspect, the reader device 110 may include a receiver coupled to an antenna that operatively detects a disturbance in the radio frequency fields produced by the transmitter. The reader device 110 may include other or different devices, such as metal detectors, or the like. Still further, the system 100 may include an antenna that comprises the camera. In those embodiments, the camera may be integrated directly into the antenna or the antenna may be configured to include a space for the camera to be added thereto, such as for example, after installation of the antenna.

In examples, the reader device 110 may collect information associated with security tags. The information may be shared or communicated with server 106. The server 106 may be a local server, remote server, one or more servers, or the like. It is noted that the server 106 may store data in a server data store 108 as described here as well as elsewhere in this disclosure. The server 106 may perform various operations.

While system 100 is described as including an entry gate 104, it is noted that pedestals or other devices can be utilized. Such devices may comprise the reader device 110, directional people counter 112, detachers (including smart detachers), deactivators, deactivation logs, reason code generators, metal detectors, voice alarms/sounders, and other appropriate components. The reader device 110 may generate an electromagnetic field in a coverage area for communicating with a security tag that is present within the coverage area.

In embodiments, the directional people counter 112 operatively detects the presence of a customer between the gate 104 and the direction at which the customer is traveling, such as entering or exiting a retail establishment. The directional people counter 112 may include a pair of beams that can detect the direction of movement of a person or persons through an area, such as between the entry gate 104. The order that the beams are interrupted may indicate the direction of travel, such as entering or exiting. It is further noted that a rate of travel for a person may be calculated based on measurements of time between the beams being interrupted. The rate of travel may be a numerical measurement (e.g., miles per hour, feet per second, etc.) or a scaled measurement (e.g., static, slow, hurried, etc.).

According to at least some embodiments, the directional people counter 112 may include cameras of any appropriate configuration and type (e.g., 2-dimensional, 3-dimensional, or the like), motion sensors (e.g., passive infrared (PIR) sensors), or the like. In at least some embodiments, the directional people counter 112 may include or communicate with a variety of different sensors. Such sensors may include photoelectric sensors, body heat sensors, even floor switches (floor mats), or the like.

A processor 114 may receive input from the reader device 110 and the directional people counter 112. While shown as a separate component, it is noted that the processor 114 may be included in whole or in part within other components, such as the reader device 110 or directional people counter 112. Moreover, the processor 114 may include or be communicatively coupled to a memory device, such as a non-transitory computer-readable memory device that operatively stores computer-executable instructions. In at least some embodiments, the directional people counter 112 may be located in alternative locations, such as in an antenna, at an overhead location, or in other locations.

The processor 114 may be in communication with a white-list. The white-list may be stored in a database on the reader device 110, managed by a remote server 106, or the like. In an example, the server 106 may comprise a server local to a retail establishment, a point-of-sale device, a networked server, a cloud-based server, or the like. The white-list may comprise a list of EPCs that, when detected by the reader device 110, will not trigger an alarm. The white-list may be populated and managed in an appropriate manner, such as by a point-of-sale system sending sold merchandise EPCs to the reader device 110 and the reader device 110 adding the sold merchandise to the white-list. In another example, the reader device 110 may scan a retail environment for EPCs and may update the white-list based on the scan. It is noted that the scan may be scheduled for specific times or at the occurrence of a particular event. In some examples, point-of-sale devices may send information to the server 106 and the server 106 may manage the white-list in server data store 108. The server 106 may transmit updates to the reader device 110. This may allow the server 106 to gather information from multiple point-of-sale devices and to transmit updates to multiple reader devices.

As described herein, the system may implement a self-learning white-list, a white-list from a remote device (e.g., a remote point of sale database), or other white-lists. The processor 114 may inhibit or enable alarms subject to the white-lists, and may utilize different criteria for inhibiting or enabling the alarms based on the type of white-list employed. For instance, the processor 114 may mute all alarms when an EPC is identified on a white-list from a remote device. In another example, the processor 114 may apply different algorithms or criteria for white-lists acquired from self-learning processes. For instance, the processor 114 may use different decision criteria to detecting a tag edge whether the EPC is in the learned white-list or not. If the EPC is in the learned whitelist this could mean the tag is closer to the exit and the edge decision may favor suppressing false alarms of this tag.

In examples, the system 100 may reduce or prevent false alarms when tagged merchandise is placed in close proximity to the point of entry 102. For instance, a retailer may be able to place up to 500 or more tagged items within a short distance (e.g., 1.5 meters, 4.9 feet, etc.) from the point of entry 102. It is noted that people may walk through the point of entry 102 with tagged items near the point of entry 102 and the system 100 may still prevent false alarms. The system 100 may be configured to adjust the detection zone, such as adjusting the detection zone outside of the antenna's alarm zone (i.e., the center of the antenna). For example, this may allow the system 100 to only trigger an alarm event when the tagged item passes a fixed distance from the antenna's alarm zone, i.e., a fixed distance from the center of the antenna.

System 100 may trigger an alarm to prevent theft or otherwise signal occurrence of an event based on a configurable. The schema may, for instance, verify whether alarm conditions are met based on the white-list, the reader device 110, and the directional people counter 112. For instance, the system 100 may trigger an alarm only when each of the following occurs: a time constraint of the reader device 110 is met; the directional people counter 112 identifies a person exiting; and an identified EPC is not on the white-list.

In an example, the reader device 110 may detect an assertive edge of a signal from a security tag. The reader device 110 may start a timer upon detecting the assertive edge. A time constraint may prevent an alarm from sounding until the time constraint is met. The time window can be set to start at a negative start time before an exit event happens. The reader device 110 alarm may be buffered so that when the directional people counter 112 detects a person exiting the point of entry 102. Upon exit, the system will look up previously buffered reader qualified alarm events that have occurred after the start of the timer. The time window is set to match with the pace of the person or persons exiting the retail store so that the alarm will only sound after the person actually exits the store. As such, information from the directional people counter 112 may be utilized to provide an adjustable alarm line.

It is noted that the time constraint or window may be determined or adjusted relative various factors. For instance, the directional people counter 112 may create a time window when an exit event is detected (e.g., when a people counter determines a person is exiting the store). The reader device 112 may monitor for a security tag and may identify when an assertive edge is detected. If the assertive edge is detected within the time window, the alarm may be triggered. It is noted that the time window may comprise a positive or negative start-time. For instance, the alarm may be triggered if the security tag assertive edge is detected before the exit event and within the start time set up by the directional people counter 112 at the moment when the exit event occurs.

According to at least one example, the system 100 may mute or otherwise prevent an alarm when more than one person is detected near unpaid tags. For example, if two or more people are walking out of a store and the reader device 112 identifies a tag that is not white-listed, the reader device 112 may silence the alarm so as to not embarrass a potential innocent person. In at least one embodiment, an image capturing device (e.g., camera, etc.) may be utilized to determine or identify the number of people near the unpaid tag. Moreover, embodiments may send notifications to a security officer or a device without generating an alarm. This may allow a security officer to identify and stop a potential thief without sounding an alarm on an innocent customer.

The directional people counter 112, as described herein, determines whether there are people exiting the store. For instance, the directional people counter 112 may detect whether persons are moving or present in the point of entry 102. The directional people counter 112 may distinguish whether the persons are entering or exiting the store based on information from one or more sensors. In some embodiments, the directional people counter 112 may compensate for how a person walks. In another aspect, the system 100 may include image capturing devices, such as a three-dimensional camera. The three dimensional camera can utilize zoning capabilities to track movement of people through the point of entry 102. The present disclosure is not limited to a three dimensional camera—any configuration of camera may be utilized. By way of non-limiting examples, a closed circuit camera may be utilized. A camera with the capability of storing the images it takes may be utilized. In those embodiments, the system 100 may record video and utilize face recognition software to identify or help identify people in video captured by the camera. Still further, the system 100 may utilize a camera from a smartphone, tablet or other such device (even a smartwatch). In these systems, the camera may come from the smartphone or other such device of the customer. The system may be able to access the cameras on such devices. In addition or in the alternative, any smartphone, tablet or other such device may be utilized such as that of the store owner or manager or even one dedicated to the retail store.

In some instances, the system 100 may generate the alarm when a tagged item leaves the store and the person holding the tagged item is completely outside of the store but within a threshold distance (e.g., 1 foot, 1 meter, etc.) from the point of entry 102. It is noted that the threshold distance may be adjusted or set according to a user's preference. Moreover, as described above, the system 100 will not generate an alarm upon a customer entering the point of entry 102, or when a customer is walking close-to the point of entry 102 or in the point of entry 102 but has not exited the store.

The system 100 is particularly useful in open air stores where there is no enclosed retail space. The system 100 allows the retailer to set the alarm zone outside of what would otherwise have been the alarm zone based on the position of the antenna or antennas. Further, the people counter 112 may be utilized to set the x-y coordinates where customers can be identified upon entering the retail store or retail store area for open air stores.

In an aspect, the processor 114 may utilize processing techniques, such as artificial intelligence, statistical models, or other processes and/or algorithms, such as supervised machine learning. These high level-processing techniques can make suggestions, provide feedback, or provide other aspects. In embodiments, master controls may utilize classifiers that map an attribute vector to a confidence that the attribute belongs to a class. For instance, master controls may input attribute vector, x=(x1, x2, x3, x4, xn) mapped to f(x)=confidence(class). Such classification can employ a probabilistic and/or statistical based analysis (e.g., factoring into the analysis sensed information and braking attributes) to infer suggestions and/or desired actions. In various embodiments, processor 112 may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority. Further still, classification may also include data derived from another system, such as automotive systems. In one non-limiting example, the system 100 may go through three levels of decision making. In the first decision, the system 100 may determine whether it will trigger an audible or visual alarm (an unauthorized person is removing an item from the retail environment). In the second decision, the system 100 may determine that no alarm is to be triggered (an authorized person is removing an item from the retail environment or the item is not actually be removed). The a third decision, the system 100 may determine that no audible alarm is to be made, but instead may provide a silent alarm (such as to the police, store employee or a separate security office).

In accordance with various aspects, some embodiments may employ classifiers that are explicitly trained (e.g., via a generic training data) as well as implicitly trained (e.g., via observing user behavior, user interactions, historical information, receiving extrinsic information). For example, support vector machines may be configured via a learning or training phase within a classifier constructor and feature selection module. Thus, the classifier(s) may be used to automatically learn and perform a number of functions, including but not limited to determining, according to historical data, image identification of clothing/bags, or the like. This learning may be on an individual basis, i.e., based solely on a single store, or may apply across a set of stores, or the entirety of stores. Information from the stores may be aggregated and the classifier(s) may be used to automatically learn and perform a number of functions based on this aggregated information. The information may be dynamically distributed, such as through an automatic update, a notification, or any other method or means, to the entire user base, a subset thereof or to an individual user. In an example, the system 100 may identify optimal layouts and arrangements of a store to achieve a desired attribute, such as decreased false alarms, or the like.

In an example, system 100 may utilize supervised machine learning as a security tag assertive edge detection mechanisms. This may define an alarm zone and may be used to reject false alarms. Processor 112 may act as both a data-collection device during the training, and as an inference engine at run-time. For instance, if a new alarm zone constraint and False-alarm constraint is needed, data to qualify for the new alarm-zone and additional false-alarm scenarios can be recollected, added to the existing data-set and re-trained offline. The result can be fed back to the processor for run-time inference purpose, in the form of filtering cubes.

In some embodiments, the system 100 may utilize three-dimensional cameras or other direction people counting devices to collect or identify additional information that can be collected at run-time, including the mass, height and direction of the moving object. The system may utilize this information to classify or qualify an alarm, e.g., such as using fuzzy logics or adding the qualification to a classifier in a machine learning training set.

Moreover, it is noted that the system 100 may utilize cameras employing artificial intelligence to process and filter out noise, and to classify objects such that people, or other objects, exiting store event and the cross-line can be more accurately depicted. In embodiments, the camera may be utilized to identify a multiple people count event (e.g., people moving both in and out) within a time window to determine the exact alarm behavior. For example, if there are multiple persons walking in or out within a tight time-window while the security-tag detect event happens, the store may opt to "not alarm" to avoid offending regular customers. As described herein, the system 100 may allow a store to provide feedback to train the system 100. In an example, a store user may provide input to the system that identifies whether an alarm was positive or a false alarm. The system 100 may utilize this feedback to train for future operations.

The system 100 is not limited to the examples of inputs described above. Almost any kind of input may be utilized with the system 100 as part of its artificial intelligence. The system 100 may use these inputs to modify, adjust, confirm or stop certain of its outputs. One such example is the system 100 may, instead of providing an alarm notification, may provide a warning to a manager or other store employee that a cashier failed to ring up a particular item in a bag of a customer. With this information, the manager or store employee may address a customer in a way to avoid an accusation of stealing while insuring that the customer actually pays for the item. The notification could comprise any kind of notification, a text alert, a phone call, an email or banner message, an audible alarm, and the like. Further still, the system 100 may utilize the artificial intelligence to alter the white list. In fact, the system 100 may be utilized to start out with a white list and as the system 100 learns, it may reduce the items on the white list or even eliminate the white list entirely. In an example, the system 100 may utilize artificial intelligence to learn that a certain item on the white list is in close proximity to the antenna. It may then use other inputs from the system 100 (e.g., the camera or the other sensors) to determine if that item is passing a line in the retail environment without being paid for that indicates it is being stolen. In this case, that item can be removed from the white list because it can remain in close proximity to the antenna, but not trigger an alarm.

Further still, the system 100 may utilize the information from the UPC of an individual item. This information may be utilized for almost any purpose. This can be included as part of the inputs identified above. The individual UPC item can be utilized instead of or as a supplement to the white list. In some embodiments, the UPC of an item may be utilized to indicate that items location in the retail environment. In these embodiments, the individual UPC may be utilized to indicate the location of that item within the retail environment. The location information may be utilized by the system 100 to determine if an alarm should be triggered or not. For example, if the system 100 determines the UPC of an item shows that I is located in the rear of the retail environment and then identifies that item as being in a predetermined proximity to the antenna, the alarm may be triggered. For items that are in a predetermined close proximity to the antenna, the opposite may occur, i.e., the system 100 may not trigger the alarm.

Figure 2:
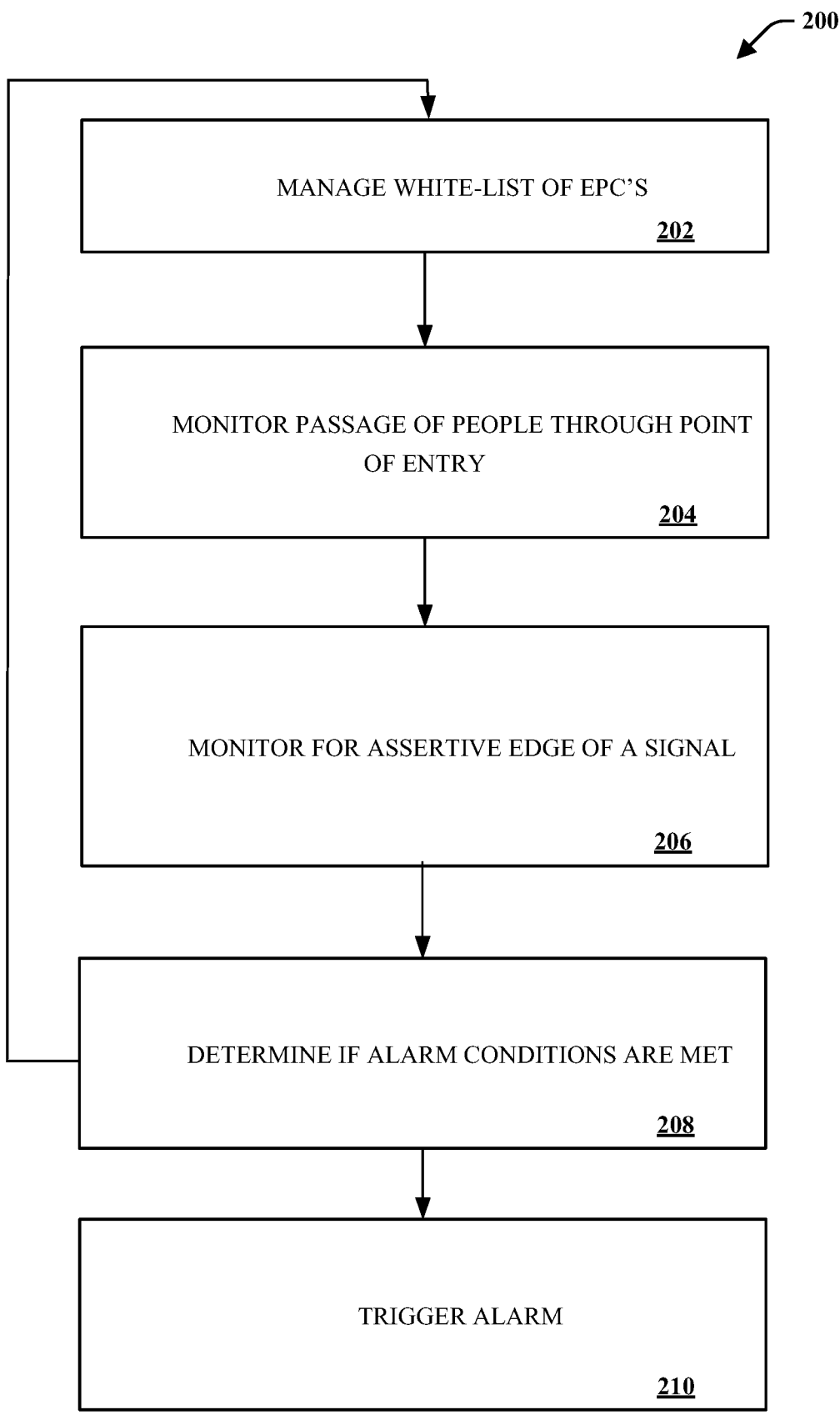
FIG. 2 is a functional block diagram of a method for managing an alarm in accordance with various disclosed aspects.

In view of the subject matter described herein, methods that may be related to various embodiments may be better appreciated with reference to the flowchart of FIG. 2. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

FIG. 2 depicts an exemplary flowchart of non-limiting method associated with a smart alarm management system, according to various aspects of the subject disclosure. As an example, method 200 may trigger an alarm in response to determining that alarm conditions are met.

At 202, a system (e.g., system 100) may manage a white-list of EPC's. It is noted that the system may manage the list of EPC's via a point-of-sale device, a server, a reader device, or the like. In an aspect, the method may add EPC's to the white-list as items are purchased or as otherwise specified. Detecting EPC's of items on the white-list will not trigger an alarm, whereas detecting of EPC's of items not on the white-list may trigger an alarm if other conditions are met.

At 204, the system may monitor passage of people through a point of entry. Monitoring passage of people may be accomplished with directional people counters, three-dimensional cameras or other imaging devices, various sensors, or the like. In an aspect, monitoring the passage of people may include determining a direction of travel, a speed, or other characteristics of people passing through the point of entry. In at least one embodiment, detection of people entering will not trigger an alarm, whereas detecting a person exiting may trigger an alarm if other conditions are met.

At 206, the system may monitor passage for an assertive edge of a signal from a security tag. For example, a reader device may determine whether a security tag is within range of a reader device as well as determine characteristics of the security tag, such as how long the security tag has been within range of the reader device, an EPC or other identifier associated with the security tag, and the like. In some embodiments, the system may monitor time windows associated with detected security tags as described here.

At 208, the system may determine whether alarm conditions are met. If alarm conditions are not met, the system will not trigger an alarm. If alarm conditions are met, the system will trigger an alarm at 210. It is noted that alarm conditions may include determining that a detected EPC is not white-listed, detecting the EPC and a detecting an exiting event within a time window constraint of detecting the EPC.

Figure 3:
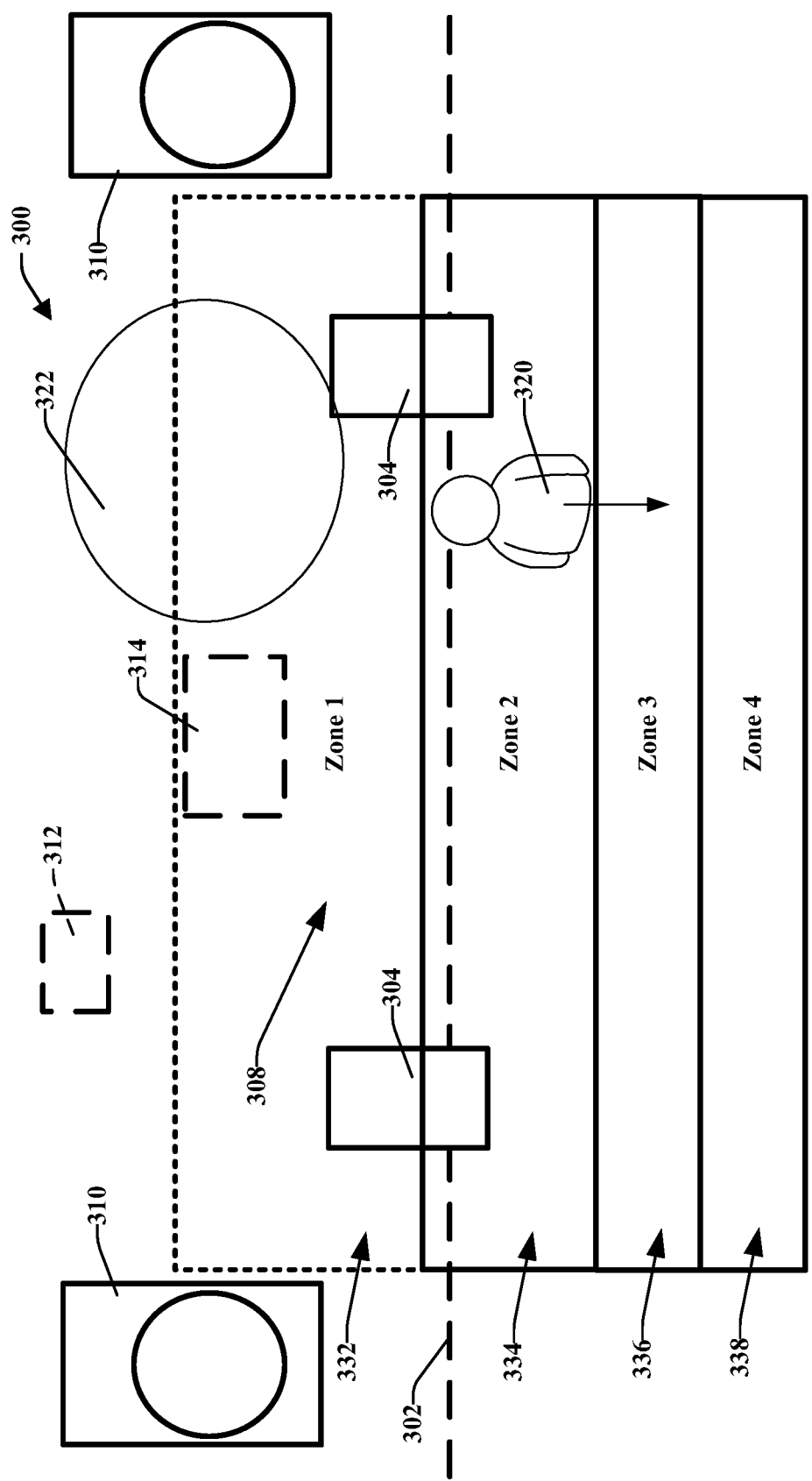
FIG. 3 is a functional diagram of a smart alarm management system comprising zones for initiating or silencing an alarm in accordance with various disclosed aspects.

Turning to FIG. 3, there is a plan view of an exemplary store 300 employing a smart alarm management system and methods (e.g., system 100, method 200, etc.). In an example, the store may comprise an entry line 302 defining a perimeter, a point of entry 308 (e.g., door, aisle, walk way, etc.), and merchandise 310. It is noted that the entry line 302 may comprise a physical barrier (e.g., wall, gate, etc.) or may comprise an arbitrary line in an open air environment. The merchandise 310 may be displayed on display racks, tables, or other objects.

The smart alarm management system may comprise one or more pedestal reader devices 304, overhead reader devices 314, or directional people counter 312. It is noted that like named parts of FIG. 3 and FIG. 1 may comprise the same or different aspects. For instance, the reader devices 104 and 304/314 may comprise similar components or functionality.

As an illustrative example, the area around the point of entry 308 may be subdivided into one or more zones, such as zones 1-4, respectively labeled as 332, 334, 336, and 338. It is noted that more or less zones may be utilized. Furthermore, zones may be identified numerically, alphabetically, or by other nomenclatures. In another aspect, the zones 332, 334, 336, and 338 may be similar or different sizes to each other.

In an embodiment, a customer 320 may be able to move freely about the store 300. The directional people counter 312 may be positioned to identify when the customer 320 moves into or out of the store 300. When the customer 320 moves within zone 1, the system will not trigger an alarm. Similarly, when the customer 320 moves in any direction while in zone 4, the system will not trigger an alarm. Rather, the system aims to trigger an alarm when the customer 320 has crossed the entry line 302, is heading out of the store, and detection of an assertive edge 322 of a non-white-listed tag meets timing thresholds or constraints. In embodiments, the system may trigger an alarm when the customer 320 is in zone 2 or zone 3 and conditions have been met.

In an example, the reader devices 304/314 may detect the assertive edge 322 of a tag and may set timing conditions. If the directional people counter 312 does not detect an exit, detection of the assertive edge 322 will not trigger an alarm. If, for example, customer 320 is identified as leaving or exiting the store 300 by the directional people counter 312 within a time constraint set by identification of the assertive edge 322, the system may generate an alarm.

In another instance, the system may determine whether multiple customers are passing through or near the point of entry 302. As an example, customer 320 may be exiting the store with a stole item while another customer is following the customer 320. The system may identify this situation and may alert a security officer or store employee by sending a message to a user device such as a pager, smartphone, tablet, wearable device, or the like. This may allow the worker to identify the potential thief without having an alarm sound on the innocent customer.

Figure 4:
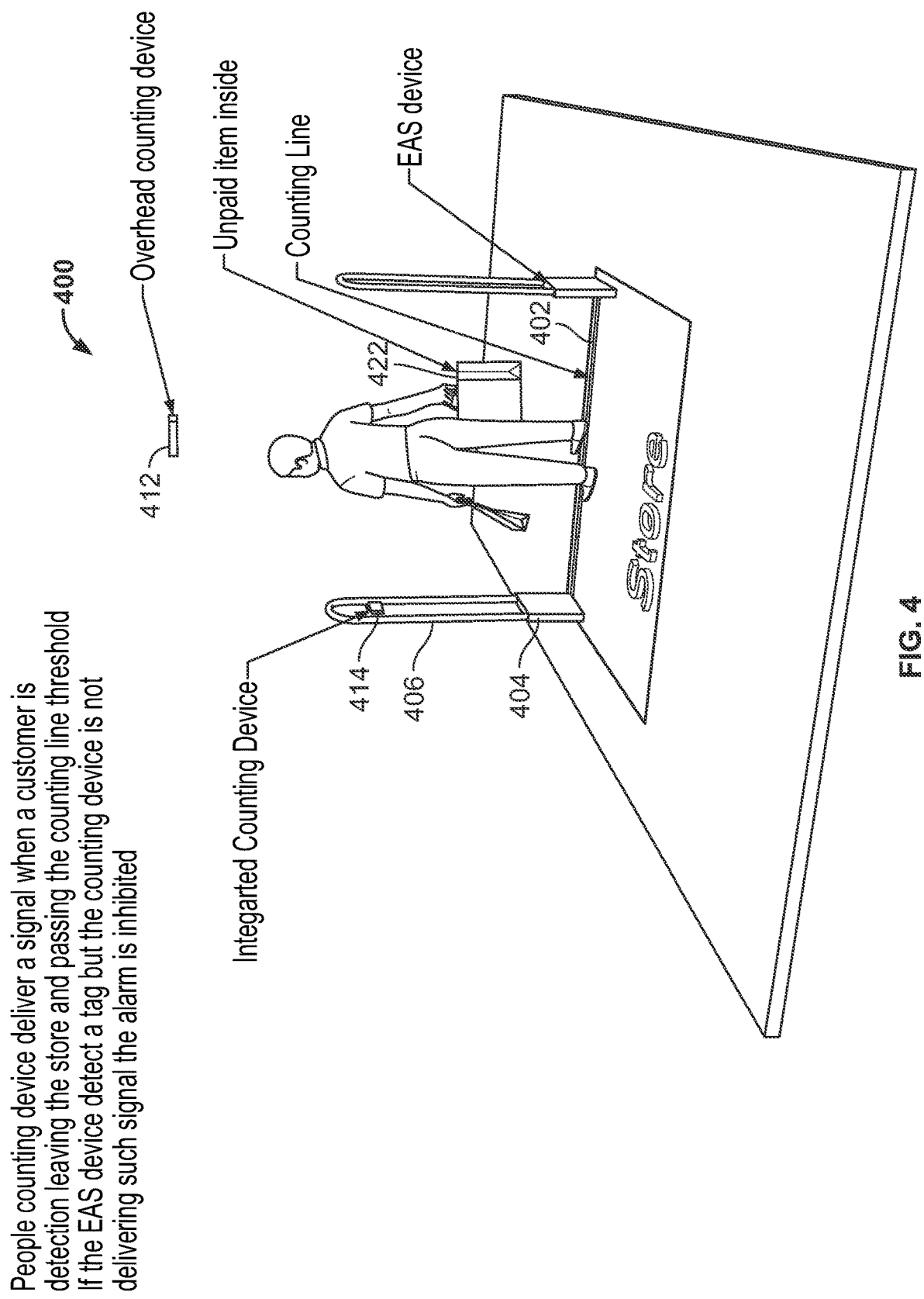
FIG. 4 is a functional diagram of a smart alarm management system with an integrated counting device and overhead counting device in accordance with various disclosed aspects.

FIG. 4 illustrates a functional diagram of a smart alarm management system 400 that may primarily include a reader device 404 (e.g., EAS pedestal, EAS device, etc.), a first directional people counter 412, and a second directional people counter 414. In an example, the first directional people counter 412 may comprise an overhead directional people counter and the second directional people counter 414 may comprise a directional people counter integrated with the reader device 404. For instance, the second directional people counter 414 may be integrated with an antenna of the reader device 404. In some examples, the second directional people counter 414 may be integrated within or with other portions of the reader device 404, within doors, displays, or other objects.

It is noted that embodiments may utilize one or both of the first directional people counter 412 and the second directional people counter 414. Moreover, embodiments may utilize other or different directional people counters that may be located in other appropriate locations. It is further noted that directional people counters may be located within a store, at a store line, or outside of a store. As such, while examples may refer to the first directional people counter 412 or the second directional people counter 414 performing an action for simplicity, it is noted that either, both, or other directional people counters may perform such actions.

In operation, the first directional people counter 412 may detect a customer in an area proximal to a counting line or point of exit/entry 402. The directional people counter 412 may determine a direction of travel of the customer, such as entering or exiting a store. The directional people counter 412 may set a flag or parameter identifying when an exit or entry event has occurred. If the event is an entry event, the directional people counter 412 may set a flag that inhibits sounding of an alarm. If the event is an exit event, the directional people counter 412 may set a flag that enables the alarm if other conditions are met. In another aspect, the directional people counter 412 may set a flag or parameter identifying that no entry/exit event is occurring, has occurred for a time period, or the like. The time period may be predetermined, based on user motion, or otherwise set as described herein.

The reader device 404 may detect or identify a tag 422. The tag 422 may be attached to an item. In an example, the tag 422 may be attached to items carried by the customer, displayed near the reader, carried by other customers, or the like. If the reader device 404 detects the tag 422 the reader device 404 may query a white-list to determine whether the tag 422 is white-listed as described herein. In another aspect, the reader device 404 may determine whether the directional people counter 412 has detected an exit event. If the tag 422 is not white-listed and an exit event has or is occurring, then the reader device 404 may generate or initiate an alarm. As described herein, if there is no exit event or the rag 422 is white-listed, then the reader device 404 may be inhibited from sounding an alarm. It is noted that embodiments may utilize timing constraints that may enable or inhibit initiation of an alarm as described herein. For instance, if the reader device 404 detects a tag 422 that is not white-listed, and an exit event is or has been identified either a determined time before or a determined time after detection of the tag 422, the reader device 404 may trigger an alarm.

FIG. 5 illustrates a functional diagram of a smart alarm management system 500 that may primarily include a reader device 504 (e.g., EAS pedestal, EAS device, etc.) and a directional people counter 512. As described herein, embodiments may include aspects described with reference to the other figures. For example, embodiments may include overhead directional people counters or directional people counters disposed at other locations.

The directional people counter 512 may monitor an area or zone 513 for entry/exit by customers. The zone 513 may comprise an area within a store proximal a counting line or point of exit/entry 502. In some embodiments the zone 530 may extend to or past the counting line 502. Moreover, the zone 513 may be adjustable according to user input or based on a machine learning or training process. It is noted that directional people counter 512 may identify or monitor other zones as described herein. The directional people counter 512 may monitor movement within the zone 513 to detect one or more persons within the zone 513 and may inhibit or enable an alarm based on the monitored movement. In at least some embodiments, one or more alarms or types of alarms may be inhibited or enabled based on the movement. For instance, alarms may include one or more of a silent alarm, audible alarm, visual alarm, or the like. The directional people counter 512 may identify motions or patterns that enable or inhibit one or more of audible, visual, or silent alarms based on the pattern or motion.

At least some embodiments may suppress or inhibit audible or visual alarms at the reader 504 or near an exit if the person triggering the alarm cannot be clearly identified by the directional people counter 512. In an example, a first customer 530 and second customer 532 may be passing through the zone 513 when conditions for initiating an alarm are detected. The directional people counter 512 may detect that a group (e.g., two or more) persons are passing through zone. In some embodiments, the directional people counter 512 may identify whether the persons are following the same path, determine speeds, determine proximity to each other, or the like. If the person responsible for triggering the alarm cannot be identified, the reader device 504 may trigger a silent alarm to be sent to a security officer or store employee. This may prevent embarrassment to others who are innocent and only walking through the zone 513 near a potential thief.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An antitheft security system for a business establishment, said security system comprising:
    at least one reader device operatively monitoring a coverage area for a signal from at least one security tag;
    at least one directional people counter operatively detecting a direction in which a person is passing through a zone of entry, and operatively identifying an exit event representing the person leaving the zone of entry; and
    a memory storing instructions and a processor coupled to the memory, the processor operatively executing the instructions to:
        query, in response to the at least one directional people counter detecting the signal from the at least one security tag, a database for information associated with the at least one security tag;
        associate a time stamp with the at least one security tag identifying when an assertive edge of a signal from the at least one security tag is detected; and
        determine whether to generate an alarm based on the information in the database associated with the at least one security tag, the time stamp, the exit event, and a timing constraint condition, and wherein the processor operatively executes the instructions to perform a machine-learning training session that modifies at least one of the timing constraint, the information in the database, or parameters associated with identifying the exit event.

2. The antitheft security system of claim 1, wherein the processor:
    inhibits generating the alarm in response to identifying that the information in the database identifies that the at least one security tag is associated with a purchased item, and
    enables generating the alarm in response to identifying that the information in the database does not identify that the at least one security tag is associated with a purchased item.

3. The antitheft security system of claim 2, wherein the processor determines to generate the alarm in response to enabling the alarm, the directional people counter identifying the exit event, and the time stamp satisfying the timing constraint condition.

4. The antitheft security system of claim 3, wherein the timing constraint condition comprises a time window associated with the exit event.

5. The antitheft security system of claim 4, wherein the processor determines that the time stamp satisfies the timing constraint condition when the time stamp falls within the time window.

6. The antitheft security system of claim 4, wherein the time window comprises a start time and an end time that are relative to the exit event, and wherein the start time is at least one of before the time of the exit event, at the time of the exit event, or after the time of the exit event.

7. The antitheft security system of claim 2, wherein the processor determines not to generate the alarm when the directional people counter does not identify the exit event.

8. The antitheft security system of claim 1, wherein the at least one reader device comprises at least one of an electronic article surveillance pedestal or a radio frequency identification pedestal.

9. The antitheft security system of claim 1, wherein said at least one directional people counter comprises at least one or a photoelectric sensor, body heat sensor, beam sensor, or a floor switch.

10. The antitheft security system of claim 1, wherein the processor manages entries in the database according to a self-learning process.

11. The antitheft security system of claim 1, further comprising a point-of-sale device that manages entries in the database.

12. An antitheft security system for a business establishment, said security system comprising:
    at least one reader device operatively monitoring a coverage area for a signal from at least one security tag;
    at least one directional people counter operatively detecting a direction of travel of objects, wherein the at least one directional people counter operatively determines whether two or more people are within an exit zone during an exit event; and
    a memory storing instructions and a processor coupled to the memory, the processor operatively executing the instructions to determine whether to initiate at least one of an audible alarm, a visual alarm, or a remote alarm at a user device communicatively coupled to the processor, wherein the processor enables initiation of the remote alarm and disables initiation of at least one of the audible or the visual alarm in response to the directional people counter identifying two or more people within the exit zone during the exit event.

13. The antitheft security system of claim 12, wherein the processor enables initiation of at least one of the audible or the visual alarm in response to the directional people counter identifying only one person within the exit zone during the exit event.

14. The antitheft security system of claim 12, wherein the directional people counter operatively determines the speed of a person during the exit event.

15. A method monitoring a business establishment and generating alerts when a theft may be occurring, said method comprising:
    providing at least one electronic article surveillance pedestal that operatively monitors a coverage area for the presence of a security tag;

providing at least one directional people counter that operatively detects when a person is moving through a zone of entry;

creating a time stamp identifying when the at least one electronic article surveillance pedestal detects the presence of the security tag;

generating an alarm in response to:
  identifying that the security tag comprises an identifier comprised within a white-list stored within a database;
  identifying that the at least one directional people counter has detected a person exiting through the zone of entry; and
  determining that the time stamp is within a time constraint defined by the at least one directional people counter detecting that a person is moving through the zone of entry; and performing a machine-learning training session via a processor, wherein the machine-learning training session modifies at least one of the timing constraint, the information in the database, or parameters associated with identifying the exit event.

16. The method of claim 15, further comprising modifying the zone of entry based on a history of generating alarms.

17. The method of claim 15, further comprising modifying a set of entries within the white-list based on information received from a point-of-sale device.

18. The method of claim 15, wherein determining that the time stamp is within the time constraint comprises determining whether the time stamp is within a determined amount of time before, during, or after the person is moving through the zone of entry.

* * * * *